Patented June 14, 1949

2,472,910

UNITED STATES PATENT OFFICE 2,472,910

TETRAHYDRO-1-HYDROXY-2- AND -3-NAPHTHAMIDOBENZALDEHYDES AND THEIR ACETALS WITH LOWER ALKANOLS AND 1,2- AND 1,3-ALKANEDIOLS

Elmore Louis Martin, Wilmington, Del., assignor to E. I. du Pont de Nemours & Company, Wilmington, Del., a corporation of Delaware No Drawing. Application April 8, 1948, Serial No. 19,871

4 Claims. (Cl. 260—338)

This invention relates to tetrahydro-1-hydroxy-2- and -3-naphthamidobenzaldehyde and lower acetals thereof, and to their preparation. More particularly it relates to such acetals with alkanols and alkanediols of not more than 4 carbon atoms.

An object of this invention is to provide a new class of organic compounds. A related object is to provide a new class of compounds which are useful as color formers and form quinoneimine dyes suitable for three-color photography. Still other objects will be apparent from the following description of the invention.

The new compounds which are provided by this invention may be represented by the general formulae:

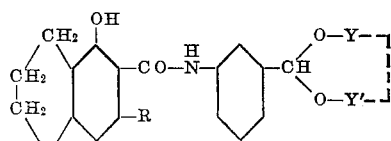

and

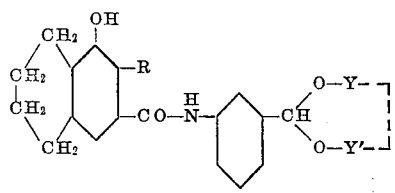

where R is hydrogen, halogen, alkoxy of 1 to 4 carbon atoms or aliphatic hydrocarbon radical of 1 to 4 carbon atoms, e. g., methyl, ethyl, isopropyl, n-propyl, n-butyl, isobutyl, allyl, methoxy, ethoxy, isopropoxy, or n-butoxy. The aldehydes can be prepared by hydrolysis of the acetal groups with aqueous acids.

The acetals of the compounds of Formulae I and II included in the present invention are those of alkanols of 1 to 4 carbon atoms, e. g., methanol, ethanol, n-propanol, isopropanol, n-butanol and isobutanol; and alkanediols of 2 to 4 carbon atoms, e. g., ethylene glycol, 1,3-propylene glycol, 1,2-propylene glycol and 1,3-butylene glycol. The acetal nucleus of such compounds may be represented by the formulae:

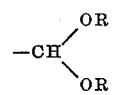 III and

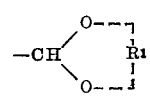 IV where R is an alkyl radical of 1 to 4 carbon atoms which corresponds to the above alcohols and $R^1$ is an alkylene radical of 2 to 4 carbon atoms which corresponds to the above alkanediols. The free bond is, of course, attached to the amidobenzene nucleus of the compounds illustrated in Formulae I and II. The hemiacetals are not comprehended or covered by the above formulae.

The above compounds can readily be prepared from the corresponding 1-hydroxy-5,6,7,8-tetrahydro-2- or -3-naphthoic acids by converting them to the corresponding acid chlorides by reaction with thionyl chloride, phosphorous, trichloride, phosphorous oxychloride, or phosphorous pentachloride, or mixtures thereof. In preparing these acid halides, it is advantageous to add to the reaction mixture from 0.1% to 1.0% by weight of pyridine based on the halogenating agent, e. g., thionyl chloride. Before this conversion is effected, the hydroxy group may be protected by acylation by various types of acylating agents, such as acetyl chloride, acetic anhydride, ethyl chlorocarbonate, benzoyl chloride, p-toluene sulfonyl chloride, etc.

The 1-hydroxy-5,6,7,8-tetrahydro-2- or -3-naphthoic acid chlorides are then condensed with m-aminobenzaldehyde or a substitution product thereof or a simple acetal of such aldehydes, e. g., a dimethyl, diethyl, or ethylene glycol acetal. The reaction is carried out in a liquid medium in the presence of a basic agent capable of removing hydrogen chloride formed. Suitable acid neutralization agents that can be used include alkali metal carbonates, bicarbonates and hydroxides, organic tertiary bases such as pyridine, piperidine, triethylamine, etc. Useful liquid media include dioxane, water, water-dioxane mixtures, ether, acetone, dimethyl formamide, etc. In place of carboxylic acid chlorides, there may be used carboxylic acid halides other than the chlorides, e. g., the corresponding bromides, but the chlorides are of most practical use.

The invention will be further illustrated but is not intended to be limited by the following examples. The parts stated are parts by weight.

EXAMPLE I m - (5,6,7,8-tetrahydro-1-hydroxy-2-naphthamido) benzaldehyde ethylene glycol acetal To a mechanically stirred suspension of 192 parts of 5,6,7,8-tetrahydro-1-hydroxy-2 - naphthoic acid in 320 parts of colorless thionyl chloride was added 4 parts of pyridine. The evolution of hydrogen chloride and sulfur dioxide was rapid and the mixture cooled to 10–15° C. After stirring for about 30 minutes at room temperature, the hydroxy acid had dissolved and at the end of 45 minutes the evolution of hydrogen chloride and sulfur dioxide was essentially complete. After 1.5 hours the excess thionyl chloride was removed under reduced pressure at 25° C., the solid mass of acid chloride being broken up and stirred from time to time to facilitate removal of the thionyl chloride. The acid chloride was obtained as a colorless crystalline compound which was dissolved in 200 parts of anhydrous dioxane and the dioxane solution was added dropwise to a mechanically stirred suspension of 160 parts of anhydrous potassium carbonate, 400 parts of water, 170 parts of m-amino-benzaldehyde ethylene glycol acetal and 400 parts of acetone maintained at 0° by means of external cooling. The mixture was stirred for a period of 30 minutes after the addition of the acid chloride was complete, then diluted to a volume of 2,000 parts by the gradual addition of cold water. The crude crystalline acetal was collected, washed first with cold 20% acetone, then 10% acetone and finally with cold water. The yield of air-dried product melting at 115–117° C. was 260–270 parts. For purification the compound was dissolved in methylene chloride, the solution treated with decolorizing charcoal and concentrated on a steam bath until the internal temperature reached 46° C. To the hot solution was added a sufficient volume of petroleum ether to induce crystallization and the mixture stirred during crystallization. After cooling to 0° C. the colorless crystals were collected, washed with a mixture of methylene chloride and petroleum ether and air dried. The product melted at 116–118° C. and was further purified by crystallization from benzene-petroleum ether mixture. The acetal thus prepared melted at 117–118° C.

Anal. Calc'd. for $C_{20}H_{21}O_4N$: C, 70.75; H, 6.24, N, 4.13. Found: C, 69.35, 70.02; H, 6.31, 6.53; N, 4.53, 4.81.

EXAMPLE II m-(5,6,7,8-tetrahydro-3-chloro-1-hydroxy-2-naphthamido) benzaldehyde ethylene glycol acetal This compound was prepared essentially as described for the preparation of m-(5,6,7,8-tetrahydro-1-hydroxy-2-naphthamido) benzaldehyde ethylene glycol acetal in Example I. Crystallization of the product from aqueous acetone gave felt-like needles melting at 186–187° C.

The other compounds comprehended by general Formulae I and II can be made in like manner from the corresponding halogen, alkoxy or alkyl substituted 5,6,7,8-tetrahydro-1-hydroxy-2- or -3-naphthoic acid chlorides and the appropriate m-aminobenzaldehyde acetal, e. g., m-aminobenzaldehyde dimethyl acetal, m-aminobenzaldehyde diethyl acetal, m-aminobenzaldehyde propylene glycol-1,3 acetal.

The acetals of Formulae I and II are crystalline compounds which have a somewhat lower melting point than the corresponding aldehydes. The aldehydes and acetals are colorless, crystalline solids which are soluble in organic solvents such as alcohols, ketones, esters, ethers, lower chlorinated aliphatic hydrocarbons, and aromatic hydrocarbons. They are insoluble in aliphatic hydrocarbons and water. These aldehydes are also soluble in aqueous alkali, from which the compound can be precipitated unchanged by the addition of carbon dioxide. They react readily with halogens, nitrous acid, sulfuric acid, and nitric acid to give the corresponding compound having the substituent introduced in the position para to the hydroxyl group. They also react readily with diazotized aromatic amino compounds to give yellow-to-red dyes.

The quinoneimine dyes formed by color-coupling development of silver halide latent images in the presence of the novel aldehydes and acetals of this invention possess excellent spectral adsorption characteristics which make them especially useful as blue-green components in three-color photography. This is a particularly noteworthy characteristic of the 1-hydroxy-2-carbon-amino type of acetal represented by the general structural Formula I, which is accordingly preferred. The color-developed dyes obtained from these compounds with a p-phenylenediamine type developer have good light stability, high tinctorial strength, and are exceptionally brilliant. Polyvinyl acetals obtained from these components are of value as blue-green color former silver halide binding agents in the preparation of a non-gelatin photographic color film and paper. The uncoupled color-forming polyvinyl acetals are exceptionally free from discoloration on exposure to light.

The new aldehydes and acetals of this invention are useful in preparing dyes for application to textiles, fibers, filaments, and films. These dyes retain their reactive aldehyde function and can thus react with the film and fiber substrate to produce fast-to-washing dyed articles. Included in the substrates are cellulosic fibers, e. g., cotton, viscose yarn, etc.; protein fibers, e. g., wool, silk; casein fibers and the like containing hydroxyl, amino, amide groups which react readily with the aldehyde group.

Polyvinyl acetals prepared from these new aldehydes are of value in other color processes where it is desired to have a tetrahydro-1-hydroxy-2-naphthamido dye intermediate structure.

The compounds of the present invention can be prepared in good yields from available economical intermediates. They can be prepared in a high state of purity which is of great advantage in preparing polyvinyl acetals therefrom which are well suited for the preparation of stain-free brilliant color photographs by the procedure of U. S. Patent 2,397,864.

As many widely different embodiments of this invention can be made without departing from the spirit and scope thereof, it is to be understood

What is claimed is:

1. A compound taken from the group consisting of the aldehydes represented by the formulae:

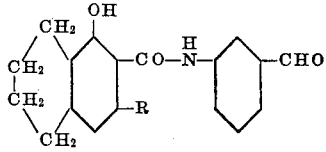

and

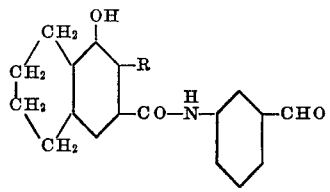

wherein R is taken from the group consisting of hydrogen, chlorine, alkoxy of 1 to 4 carbon atoms and alkyl radicals of 1 to 4 carbon atoms and allyl, and their acetals with a hydroxy compound taken from the group consisting of alkanols of 1 to 4 carbon atoms and 1,2- and 1,3-alkanediols of 2 to 4 carbon atoms.

2. A compound taken from the group consisting of the aldehydes represented by the formula:

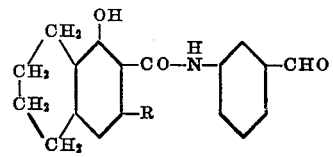

wherein R is taken from the group consisting of hydrogen, chlorine, alkoxy of 1 to 4 carbon atoms and alkyl radicals of 1 to 4 carbon atoms and allyl, and their acetals with a hydroxy compound taken from the group consisting of alkanols of 1 to 4 carbon atoms and 1,2- and 1,3-alkanediols of 2 to 4 carbon atoms.

3. The compound of the formula:

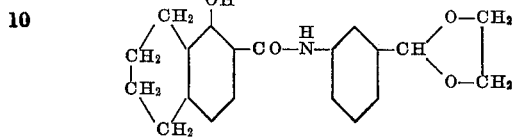

4. The compound of the formula:

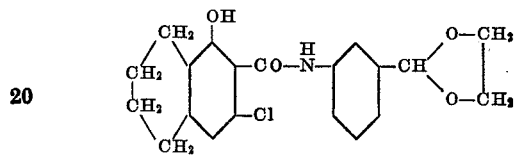

ELMORE LOUIS MARTIN.

No references cited.